(12) United States Patent
Lee et al.

(10) Patent No.: US 7,889,829 B2
(45) Date of Patent: Feb. 15, 2011

(54) NUCLEAR FUEL ASSEMBLY PROTECTIVE GRID

(75) Inventors: Yu Chung Lee, Columbia, SC (US); James Alan Sparrow, Irmo, SC (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 957 days.

(21) Appl. No.: 10/932,908

(22) Filed: Sep. 2, 2004

(65) Prior Publication Data
US 2006/0045231 A1 Mar. 2, 2006

(51) Int. Cl.
*G21C 3/34* (2006.01)
(52) U.S. Cl. .................. 376/438; 376/462; 376/439
(58) Field of Classification Search .................. 376/310, 376/313, 352, 277, 462, 440, 442, 438, 439; 176/78, 76 X
See application file for complete search history.

(56) References Cited

U.S. PATENT DOCUMENTS

| | | | | |
|---|---|---|---|---|
| 3,852,154 A | * | 12/1974 | Carlson et al. | 376/442 |
| 4,096,032 A | | 6/1978 | Mayers et al. | |
| 4,125,435 A | * | 11/1978 | Jabsen | 376/442 |
| 4,165,256 A | * | 8/1979 | Jabsen | 376/442 |
| 4,594,216 A | * | 6/1986 | Feutrel | 376/442 |
| 4,652,425 A | * | 3/1987 | Ferrari et al. | 376/352 |
| 4,659,541 A | * | 4/1987 | Rylatt | 376/442 |
| 4,781,884 A | * | 11/1988 | Anthony | 376/352 |
| 4,900,507 A | * | 2/1990 | Shallenberger et al. | 376/352 |
| 4,919,883 A | * | 4/1990 | Bryan | 376/352 |
| 5,024,807 A | * | 6/1991 | Hatfield et al. | 376/352 |
| 5,638,416 A | * | 6/1997 | Oyama et al. | 376/442 |
| 6,519,309 B1 | * | 2/2003 | Van Swam | 376/442 |
| 6,608,880 B2 | * | 8/2003 | Smith et al. | 376/352 |
| 6,888,911 B2 | * | 5/2005 | Stabel-Weinheimer et al. | 376/438 |

OTHER PUBLICATIONS

Webster's Dictionary, 2005, p. 231.*

* cited by examiner

*Primary Examiner*—Jack Keith
*Assistant Examiner*—Erin M Leach (57) ABSTRACT

An integral multilevel debris-catching system for a nuclear reactor fuel assembly having a lower protective grid incorporating laterally offset debris-catching arches at several elevations, extended solid fuel rod bottom end plugs and a bottom debris-filtering nozzle. Dimples and opposing opposite springs and the debris-trapping arches, which are spaced from the end plugs, are all located at elevations below the fuel cladding.

17 Claims, 5 Drawing Sheets

NUCLEAR FUEL ASSEMBLY PROTECTIVE GRID

BACKGROUND OF THE INVENTION

1. Field of the Invention

The present invention relates generally to nuclear reactors and, more particularly, is concerned with a debris filter grid for a nuclear fuel assembly.

2. Related Art

During manufacturing, subsequent installation and repair of components of a nuclear reactor coolant circulation system, diligent effort is made to help assure removal of all debris from the reactor vessel and its associated systems, which circulate coolant throughout the primary reactor coolant loop under various operating conditions. Although elaborate procedures are carried out to help assure debris removal, experience shows that in spite of the safeguards used to effect such removal, some chips and metal particles still remain hidden in the systems. Most of the debris consists of metal turnings, which were probably left in the primary system after steam generator repair or replacement.

In particular, fuel assembly damage due to debris trapped at the lowermost grid has been noted in several reactors in recent years. Debris enters through the fuel assembly bottom nozzle flow holes from the coolant flow openings in the lower core support plate when the plant is started up. The debris tends to become lodged in the lowermost support grid of the fuel assembly within the spaces between the "egg crate" shaped cell walls of the grid and the lower end portions of the fuel rod tubes. The damage consists of fuel rod tube perforations caused by fretting of the debris in contact with the exterior of the tube. Debris also becomes entangled in the nozzle plate holes and the flowing coolant causes the debris to gyrate, which tends to cut through the cladding of the fuel rods.

Several different approaches have been proposed and tried for carrying out the removal of debris from nuclear reactors. Many of these approaches are discussed in U.S. Pat. No. 4,096,032 to Mayers et al. Others are illustrated and described in the various patents cross-referenced, in U.S. Pat. No. 4,900,507, assigned to the instant assignee. While all of the approaches described in the cited patent and cross references operate reasonably well and generally achieve their objectives under the range of operating conditions for which they were designed, a need still exists for a further improved approach to the problem of debris filtering in nuclear reactors, to address an improved reduction in pressure drop across the bottom nozzle that is required for more advanced fuel designs currently going under development. That improvement is addressed, in part, in co-pending application Ser. No. 10/51, 349, filed Jan. 5, 2004. A further need exists to trap even smaller debris without substantially increasing the pressure drop across the fuel assembly.

SUMMARY OF THE INVENTION

The present invention provides a debris filter lowermost grid in a fuel assembly designed to satisfy the aforementioned needs. The debris filter lowermost grid of this invention is positioned just above the fuel assembly bottom nozzle and is generally formed from a spaced array of two orthogonally arranged parallel, spaced arrays of elongated straps connected in an egg crate lattice pattern. The lattice defines a number of cells, most of which support the fuel rods of the fuel assembly. Each of the fuel rods cells include at least two protrusions that extend into the fuel rod cells at different elevations. Each protrusion extends from the wall of the cell at a location offset from the lateral center of the cell wall from which the protrusions extend. Preferably, the protrusions are formed as arches that are stamped from the cell wall and attached to the wall at the base of the arches. In the preferred embodiment, the protrusions are located in the proximity of the four corners of the cell at elevations along the exposed lower fuel rod end plug, desirably below the fuel rod cladding and do not contact the end plug. Dimples also extend from preferably two of the cell walls to laterally support the fuel rods and contact the fuel rods on the lower end plug. In the preferred embodiment, the dimples and arches are respectively, laterally offset from one another.

The protective grid of this invention can be formed as a stand alone component or can be constructed from wider integral straps that combine the structure of the debris filtering grid of this invention with the structure of a conventional grid. The debris filter lowermost grid of this invention preferably works in combination with the debris filter bottom nozzle described in co-pending application Ser. No. 10/751, 349, filed Jan. 5, 2004.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

In the following description, like reference characters designate like or corresponding parts throughout the several views of the drawings. Also in the following description, it is to be understood that such terms as "forward", "rearward", "left", "right", "upwardly", "downwardly" and the like are words of convenience and are not to be construed as limiting terms.

Fuel Assembly

Figure 1:
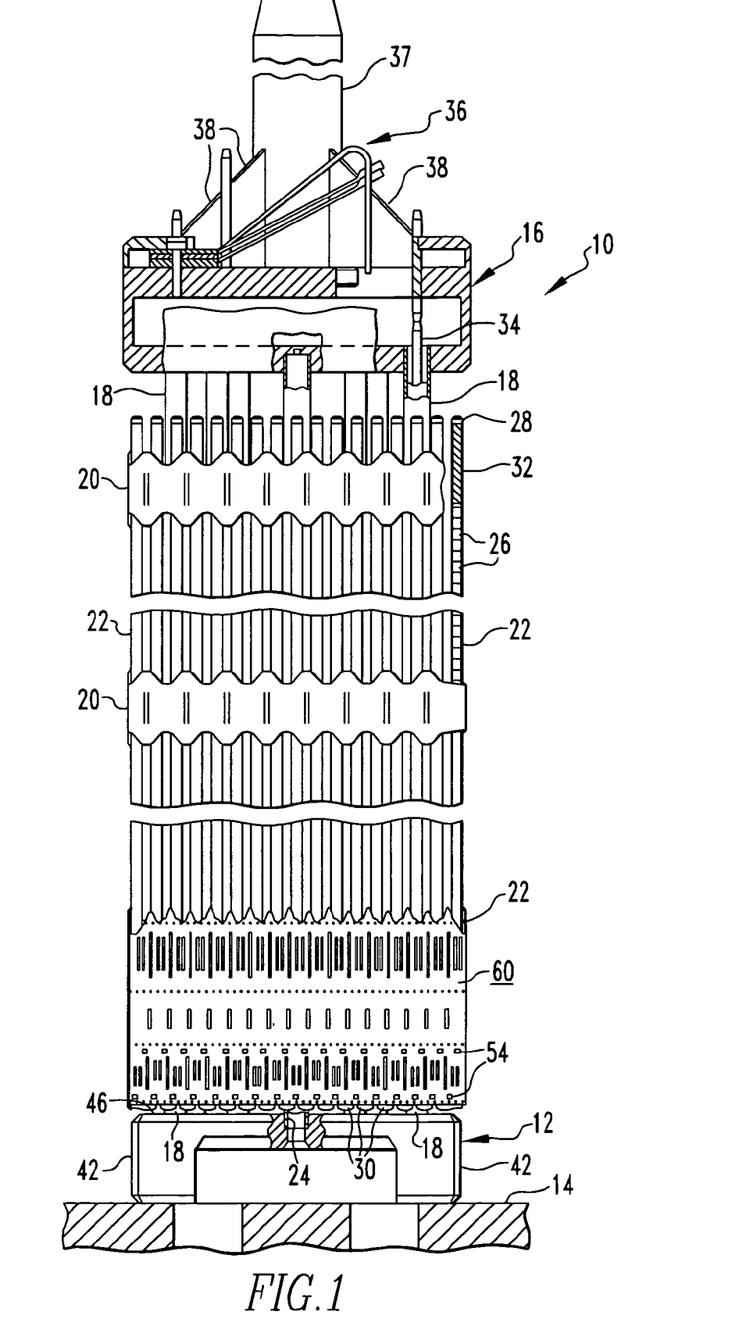
FIG. 1 is an elevational view, partially in section, of a fuel assembly in which is incorporated the preferred embodiment of the debris trap of the present invention, the assembly being illustrated in vertically shortened form, with parts broken away for clarity.

Referring now to the drawings and particularly to FIG. 1, there is shown an elevational view of the fuel assembly, represented in vertically shortened form and being generally designated by reference numeral 10. The fuel assembly 10 is the type used in a pressurized water reactor and has a structural skeleton which, at its lower end, includes the debris filter bottom nozzle 12, which is described more fully in co-pending patent application Ser. No. 10/751,349. The bottom nozzle 12 supports the fuel assembly 10 on a lower core support plate 14 in the core region of the nuclear reactor (not shown). In addition to the bottom nozzle 12, the structural skeleton of the fuel assembly 10 also includes a top nozzle 16 at its upper end and a number of guide tubes or thimbles 18, which extend longitudinally between the bottom and top nozzles 12 and 16 and at opposite ends are rigidly attached thereto.

The fuel assembly 10 further includes a plurality of traverse grids 20 axially-spaced along, and mounted to, the guide thimble 18 and an organized array of elongated fuel rods 22 traversely-spaced and supported by the grids 20. Also, the assembly 10 has an instrumentation tube 24 located in the center thereof and extending between, and mounted to, the bottom and top nozzles 12 and 16. With such an arrangement of parts, fuel assembly 10 forms an integral unit capable of being conveniently handled without damaging the assembly parts.

As mentioned above, the fuel rods 22 in the array thereof in the assembly 10 are held in spaced relationship with one another by the grids 20 spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid moderator/coolant such as water or water containing boron, is pumped upwardly through a plurality of flow openings in the lower core plate 14 to the fuel assembly. The bottom nozzle 12 of the fuel assembly 10 passes the coolant upwardly through the guide tubes 18 and along the fuel rods 22 of the assembly in order to extract heat generated therein for the production of useful work.

To control the fission process, a number of control rods 34 are reciprocally moveable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 with a plurality of radially-extending flukes or arms 38. Each arm 38 is interconnected to control rod 34 such that the control rod mechanism 36 is operable to move the control rods vertically in the guide thimbles 18 to thereby control the fission process in the fuel assembly 10, all in a well known manner.

Debris Filter Bottom Nozzle

As mentioned above, fuel assembly damage due to debris trapped at or below the lowermost one of the grids 20 supporting the fuel bearing regions of the fuel rods has been found to be a problem. Therefore, to prevent occurrence of such damage, it is highly desirable to minimize the debris that passes through the bottom nozzle flow holes or the interfaces between the outlets of the bottom nozzle flow holes and the adjoining structures.

Figure 2:
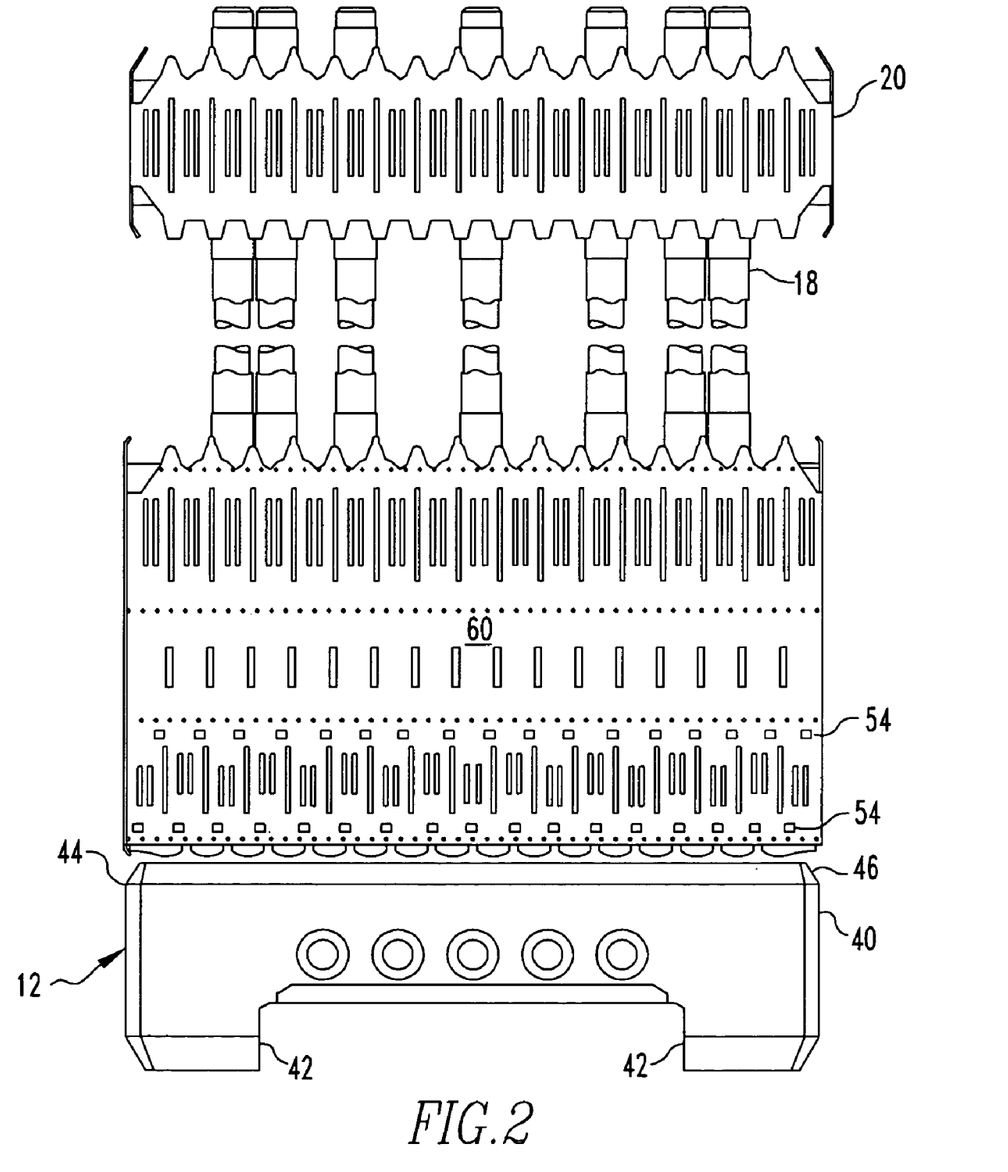
FIG. 2 is a side view of a lower portion of a fuel assembly skeleton illustrating one embodiment of this invention, which provides an integral hybrid grid.

The invention described in U.S. patent application Ser. No. 10/751,349 relates to a bottom nozzle 12 which, in addition to supporting the fuel assembly 10 on the lower core plate 14, also contains features which function to filter out potentially damaging size debris from the coolant flow passed upwardly through the bottom nozzle with a reduction in pressure drop over previous designs. The bottom nozzle 12 includes support means, for example the skirt 40 shown in FIG. 2. The support means, skirt 40 in this embodiment, includes a plurality of corner legs 42 for supporting the fuel assembly 10 on the lower core plate 14. A generally rectangular planar plate 46 is suitably attached, such as by welding, to the upper surface 44 of the support skirt 40. In the nozzle plate 46 of the debris filter bottom nozzle 12 of the present invention, a large number of small holes 48 (shown in FIG. 5) are concentrated in the area of the flow holes through the lower core support plate 14 and are sized to filter out damaging size debris without adversely affecting flow or pressure drop through the bottom nozzle adapter plate 46 and across the fuel assembly 10, which substantially covers every portion of the plate 46 across its length and breadth.

The diameter of the flow holes 48 does not allow passage of most of the debris that is of a size typically caught in the lowermost support grid 20. If the debris is small enough to pass through these plate flow holes 48, it will in most cases also pass through the grids 20 since the diameter of the flow holes 48 is small enough to catch most of the debris having a cross section larger than that of the unoccupied spaces through a cell of the support grid 20. Such unoccupied spaces are typically found in adjacent corners formed by the interleaved straps comprising the grid 20 and are bounded by the corners, respective dimples and springs formed on the grip straps, and the fuel rods 22, which extend through the grid cells. By insuring that most of the debris is small enough to pass through the grids unoccupied spaces, the debris filter bottom nozzle 12 significantly reduces the potential for debris-induced fuel rod failures. It should be appreciated that the improvement of co-pending U.S. patent application Ser. No. 10/751,349 does not require that the narrowest cross section of the flow through holes 48 in the nozzle plate 46 be equal or smaller than the largest cross sectional dimension of the unoccupied spaces through a cell of the support grid 20, especially when the outlet of the flow through holes 48 effectively operate in conjunction with adjoining structures, such as this invention, to further constrict the flow path. For example, when protective grids, such as that of this invention, are employed, which typically are located approximately 0.025 to 0.125 inch (0.064 to 0.318 cm) above the nozzle plate 46, the grid straps and protrusions further delimit the flow and trap debris in the area within and between the protective grid and the nozzle plate.

Debris Filter Protective Grid

The improved debris-catching system of this invention provides an integrated spacer grid design to be used in a nuclear fuel assembly to support fuel rods and filter-entrained debris in coolant. The spacer grid design has multilevel debris-catching features which provide the debris-filtering function. The filtering features include debris-filtering arches, which may be similar to the dimples which support the fuel rods under the pressure of opposing grid springs, except that the debris-filtering arches do not contact the fuel rods, and reduce fretting wear by trapping debris at fuel rod solid end plug elevations. Two debris-catching systems, working with the debris filter bottom nozzle described above, and extended solid end plugs, are described to provide an improved integrated design.

Two embodiments of this invention are illustrated in the figures. The first is an integrated hybrid protective grid design 60 shown in FIG. 2, which is a combination of the intermediate grid 20 shown in FIG. 1 and a lower protective grid with two levels of debris-catching arches 54, identified in FIG. 2 and described more fully with regard to FIGS. 4 and 5.

Figure 3:
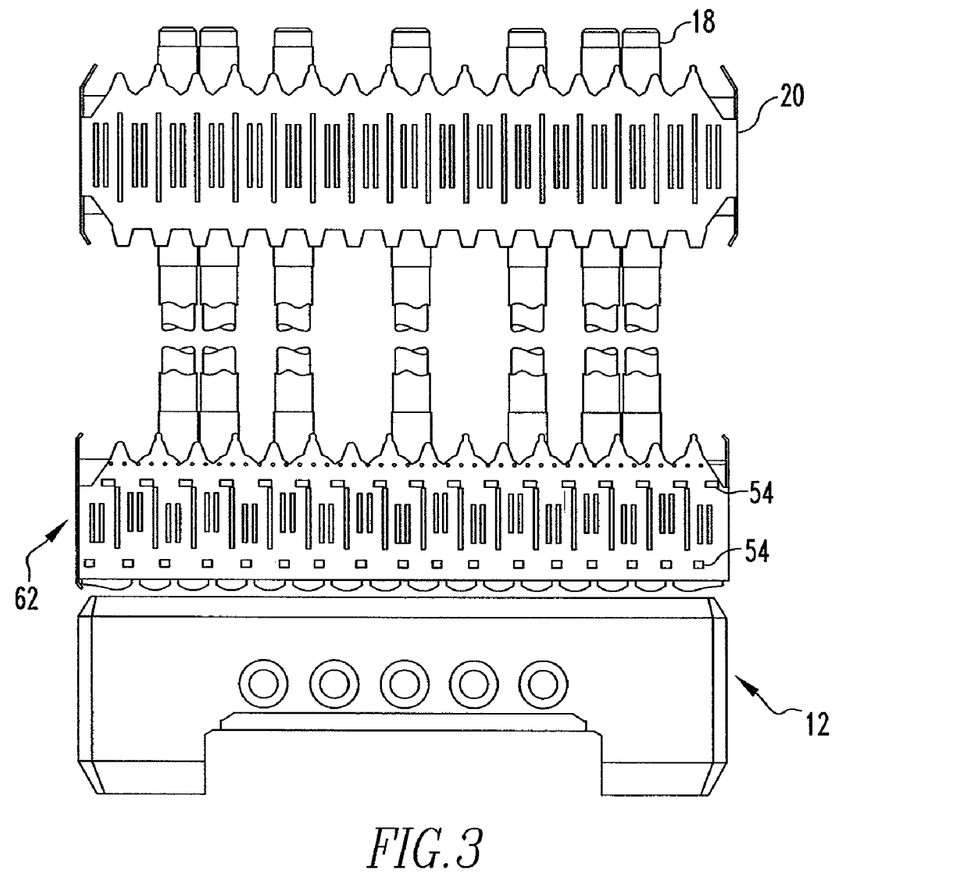
FIG. 3 is a side view of a lower portion of a fuel assembly skeleton illustrating a second embodiment of this invention, which provides a separate lower protective grid.

The second embodiment of this invention is illustrated in FIG. 3 and provides a stand-alone improved protective grid 62 with two levels of debris-catching arches 54.

The debris catching or protective grid of this invention is used in a nuclear fuel assembly to trap debris and to support fuel rods and maintain proper spacing among the fuel rods. The protective grid is formed in the shape of a lattice with intersecting grid straps 56 forming lattice members defining a plurality of cells, in an egg-crate pattern, with most of the cells supporting the nuclear fuel rods, which pass there-through. Welds 58 at the grid strap intersections secure the straps in fixed relation to each other. The remaining cells support nuclear control rod guide tubes and instrumentation thimbles. The cell-supporting fuel rods are provided with specially designed grid dimples on two adjacent walls. The dimples are oriented horizontally to maximize debris capture and minimize hydraulic drag in the assembly. The dimples also capture the fuel rods to minimize lateral vibration and wear of the fuel rods and extend over the flow holes of the bottom nozzle to improve debris capture. Springs on the walls opposite the dimples bias the fuel rods, at the solid lower end plug elevation, against the dimples and thus support each fuel rod within its respective cell.

Figure 4:
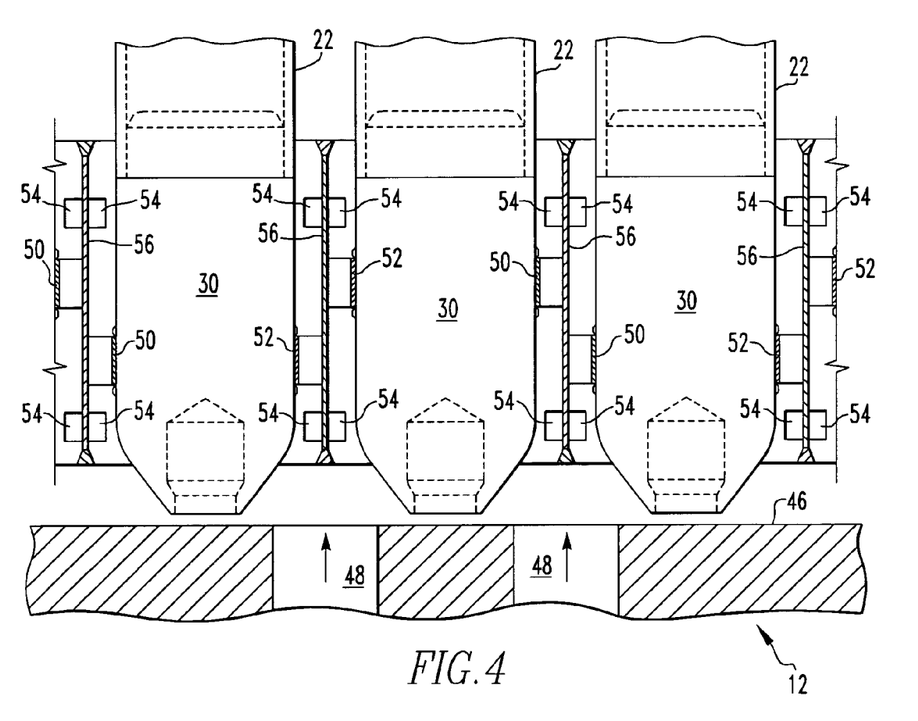
FIG. 4 is side cut away sectional view of the lower protective grid of this invention with the front strap removed.
Figure 5:
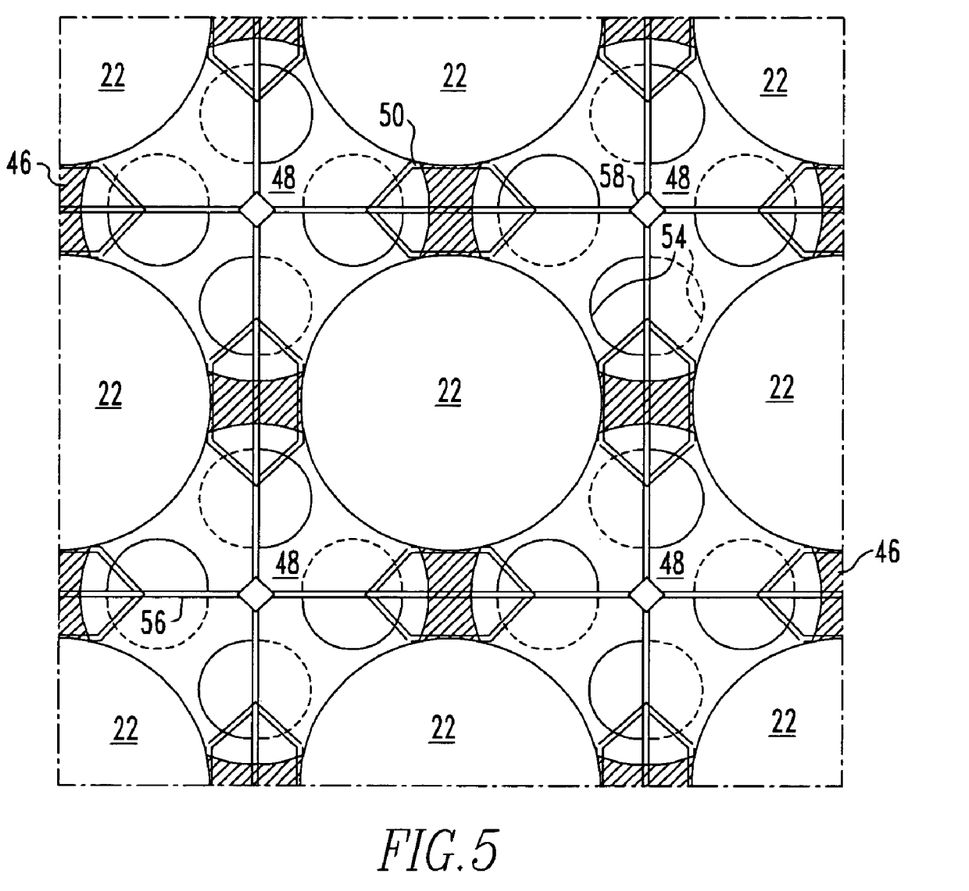
FIG. 5 is a top schematic view of the protective grid of this invention positioned over the flow holes of the bottom nozzle.

This invention provides additional debris arches 54, which may be similar to the dimples, but do not contact the fuel rods. The modified arches are situated at two elevations, as shown in FIG. 4 by reference character 54. The arches are also laterally offset as can be appreciated from FIG. 5. Referring to FIG. 5, it can be seen that the lower arches 54 are shown in phantom, and the laterally offset, upper arches 54 are shown in solid line. The offset debris-filtering arches 54 above and below the protective grid dimples 50 are designed, in cooperation with the flow-through holes 48 of the debris filter bottom nozzle, to trap debris passing through the debris filter bottom nozzle.

The purpose of the two levels of offset arches 54 is to satisfy the U.S. Regulatory Guide 1.82 requirements. The offset helps to assure that there are no flow restrictions in the Emergency Core Cooling System (ECCS) flow path that are likely to become blocked by particular debris during the Long Term Cooling (LTC) phase of a postulated Loss Of Coolant Accident (LOCA). The end plug length is slightly extended over prior designs to extend above the upper debris-catching arch 54 to prevent potential contact between the cladding and the trapped debris that might otherwise fret the cladding. As shown in FIG. 4, the gap clearance between the inner straps and the debris filter nozzle, i.e., 0.25 to 0.125 inch (0.064 to 0.318 cm), is optimized to meet the sump screen requirements. The sump screen requirements indicate that the sump screen is the most limiting dimension in the ECCS flow path. Although the fuel assembly will trap debris that is smaller than that of the sump screen size, the plugging of those flow passages is not allowed.

The protective grid 60/62, solid lower end plug 30, arches 54 and debris filter bottom nozzle 12 together provide a protective zone, below the active fuel region, in which debris can be trapped safely. Fretting wear by a piece of debris would occur on a solid end plug and not on fuel cladding. As shown in FIG. 5, the straps 56 of the protective grid 60/62 subdivide the protected flow area of the hole 48 in the debris filter bottom nozzle plate 46. The projected debris-catching arches 54 form four additional circular screens to subdivide each flow hole 48, further reducing the size and shape of flow debris that might pass into the active fuel region.

For both the integrated hybrid protective/bottom grid design 60 and the improved stand alone protective grid design 62, the locations of the debris filtering arches will be optimized to minimize the pressure loss design consideration. Dimple 50 and arch 54 height, width, bend, location and radii is adapted to maximize the hydraulic performance of the grid. FIG. 5 shows a typical grid cell overlayed flow hole pattern with the protective grid design of this invention. With the exception of thimble cells, the arches 54 form a four-circular screen within each flow hole to prevent debris from entering the active fuel region.

Thus, this invention provides two levels of debris-catching arches, which form a four filtering circular screen system within a flow hole 48 flow path, before the flow enters the active fuel region, that enhances debris filtering efficiency working in conjunction with the protective grid dimple.

Offset top and lower debris-catching arches with the grid straps 56 bisecting the debris filter bottom nozzle flow holes 48 enhance the efficiency of the debris-catching capability of the debris filter bottom nozzle while meeting sump screen design requirements. The solid fuel rod end plug extending to or above the height of the upper debris filtering arches 54 restrict the trapped debris-induced contact and wear to the solid plug 30 region. Protective grid dimple-to-rod contact only on the solid end plug 30 provides positive dimple support for the nuclear fuel rod during reactor operation without cladding wear. The invention may be employed as a standalone protective grid 62 as shown in FIG. 3 or as the integral hybrid grid that includes a lower protective grid section incorporating the offset debris-catching arches 54 at two elevations and an upper grid section substantially similar in construction to that of the intermediate grid 20.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A fuel assembly for a nuclear reactor including:
    a plurality of elongated nuclear fuel rods having an extended axial length;
    at least a lowermost grid supporting said fuel rods in an organized array and having unoccupied spaces defined therein to allow a flow of fluid coolant there-through and past said fuel rods when said fuel assembly is installed in the nuclear reactor;
    a plurality of guide thimbles extending along said fuel rods through and supporting said grid;
    a bottom nozzle disposed below said grid, below lower ends of said fuel rods, supporting said guide thimbles and permitting the flow of fluid coolant into said fuel assembly, said bottom nozzle comprising a substantially horizontal plate extending transverse to the axis of the fuel rods and having an upper face directed toward said lowermost grid, said upper face of said plate having defined there-through a plurality of flow through holes extending completely through said plate for the passage of the fluid coolant from a lower face of said plate to the upper face of said plate, each of said coolant flow through holes in fluid communication with said unoccupied spaces; and
    said lowermost grid comprising a first, spaced, parallel arrangement of elongated straps extending along a plane substantially orthogonal to the axis of the fuel assembly and a second, spaced, parallel arrangement of elongated straps extending along the plane substantially orthogonal to the axis of the fuel assembly and perpendicular to the first, spaced, parallel arrangement of elongated straps in an egg-crate lattice arrangement that defines a plurality of cells therein through which the fuel rods and guide thimbles pass, each of a first plurality of said cells, through which the fuel rods pass, having walls respectively with a cell height along the axial dimension of the fuel assembly equal to the width of one of the first and second, spaced, parallel arrangement of elongated straps and a cell width along the elongated dimension of the corresponding, elongated strap, and a wall of each of the first plurality of said cells having at least two distinct protrusions that separately extend from the wall inwardly into the cell respectively at different elevations along the height of the wall of the first plurality of cells respectively laterally offset from the center of the cell wall from which the protrusions extend with the protrusions on each of the cell walls from which the protrusions extend arranged in an asymmetric pattern about both a horizontal and a vertical plane and spaced from the nuclear fuel rods at least at the beginning of life of the fuel assembly.

2. The fuel assembly of claim 1 wherein the lowermost grid is positioned substantially adjacent the bottom nozzle.

3. The fuel assembly of claim 2 wherein the bottom nozzle is a debris filter.

4. The fuel assembly of claim 1 wherein the protrusions on the walls from which protrusions extend are offset from one another along the width of the cell walls.

5. The fuel assembly of claim 1 including dimples on the lowermost grid that contact and support corresponding fuel rods substantially in a direction perpendicular to the axis of the fuel assembly.

6. The fuel assembly of claim 5 wherein the dimples and protrusions in each cell of the first plurality of cells are respectively offset from one another along the width of the cell walls.

7. The fuel assembly of claim 1 wherein at least some of the protrusions on the lowermost grid are located at a height along the cell wall coinciding with an elevation of a lower end plug on a corresponding fuel rod.

8. The fuel assembly of claim 7 wherein all of the lowermost protrusions in the at least one wall of the lower most grid are located at the height along the cell wall coinciding with the elevation of the lower end plug of the fuel rod.

9. The fuel assembly of claim 8 wherein substantially all of the protrusions in the at least one wall of the lower most grid are located at the height along the cell wall coinciding with the elevation of the lower end plug of the fuel rod.

10. The fuel assembly of claim 9 wherein substantially all of the protrusions in the at least one wall of the lower most grid are located at the height along the cell wall coinciding with the elevation of a solid portion of the lower end plug of the fuel rod.

11. The fuel assembly of claim 9 wherein substantially all of the protrusions are located at the height along the cell wall coinciding with an elevation below a cladding wall of the fuel rod.

12. The fuel assembly of claim 1 wherein the protrusions are located in proximity to corners of each of the first plurality of cells.

13. The fuel assembly of claim 1 wherein the protrusions are arches.

14. The fuel assembly of claim 13 wherein the arches are formed from a stamped portion of the cell wall connected to the cell wall at a base of the arch.

15. The fuel assembly of claim 13 wherein the arches are elongated with the elongated dimension of the arches extending laterally across a portion of the width of the cell walls of the first plurality of cells.

16. A grid for a nuclear fuel assembly comprising:
a first, spaced, parallel arrangement of elongated straps extending along a plane substantially orthogonal to the axis of the fuel assembly;
a second, spaced, parallel arrangement of elongated straps extending along the plane substantially orthogonal to the axis of the fuel assembly and perpendicular to the first, spaced, parallel arrangement of elongated straps in an egg crate lattice arrangement that defines a plurality of cells therein respectively through which either a fuel rod or a guide thimble passes; and
each of a first plurality of said cells, through which the fuel rods pass, having walls respectively with a cell height along the axial dimension of the fuel assembly equal to the width of one of the first and second, spaced, parallel arrangement of elongated straps and a cell width along the elongated dimension of the corresponding, elongated strap, and a wall of each of the first plurality of said cells having at least two distinct protrusions that separately extend from the wall inwardly into the cell respectively at different elevations along the height of the wall of the first plurality of cells respectively laterally offset from the center of the cell wall from which the protrusions extend with the protrusions on each of the cell walls from which the protrusions extend arranged in an asymmetric pattern about both a horizontal and a vertical plane and spaced from the nuclear fuel rods at least at the beginning of life of the fuel assembly.

17. A fuel assembly for a nuclear reactor including:
a plurality of elongated nuclear fuel rods having an extended axial length;
at least a lowermost grid supporting said fuel rods in an organized array and having unoccupied spaces defined therein to allow a flow of fluid coolant there-through and past said fuel rods when said fuel assembly is installed in the nuclear reactor;
a plurality of guide thimbles extending along said fuel rods through and supporting said grid;
a bottom nozzle disposed below said grid, below lower ends of said fuel rods, supporting said guide thimbles and permitting the flow of fluid coolant into said fuel assembly, said bottom nozzle comprising a substantially horizontal plate extending transverse to the axis of the fuel rods and having an upper face directed toward said lowermost grid, said upper face of said plate having defined there-through a plurality of flow through holes extending completely through said plate for the passage of the fluid coolant from a lower face of said plate to the upper face of said plate, each of said coolant flow through holes in fluid communication with said unoccupied spaces; and
said lowermost grid comprising a first, spaced, parallel arrangement of elongated straps extending along a plane substantially orthogonal to the axis of the fuel assembly and a second, spaced, parallel arrangement of elongated straps extending along the plane substantially orthogonal to the axis of the fuel assembly and perpendicular to the first, spaced, parallel arrangement of elongated straps in an egg-crate lattice arrangement that defines a plurality of cells therein through which the fuel rods and guide thimbles pass, each of a first plurality of said cells, through which the fuel rods pass, having walls respectively with a cell height along the axial dimension of the fuel assembly equal to the width of one of the first and second, spaced, parallel arrangement of elongated straps and a cell width along the elongated dimension of the corresponding, elongated strap, and a wall of each of the first plurality of said cells having at least two distinct protrusions that separately extend from the wall inwardly into the cell respectively at different elevations along the height of the wall of the first plurality of cells respectively laterally offset from the center of the cell wall from which the protrusions extend with the protrusions on each of the cell walls from which the protrusions extend arranged in an asymmetric pattern about both a horizontal and a vertical plane and spaced from the nuclear fuel rods at least at the beginning of life of the fuel assembly and wherein the first plurality of said cells has at least one wall from which a spring extends into the cells to contact and support the corresponding fuel rods and the at least two distinct protrusions are positioned at elevations along the height of the wall from which the spring extends at elevations on either side of the spring.

* * * * *